US009482359B2

(12) United States Patent
Borchgrevink et al.

(10) Patent No.: US 9,482,359 B2
(45) Date of Patent: Nov. 1, 2016

(54) ELECTRICALLY OPERATED VALVE ACTUATOR WITH ELECTRO-MECHANICAL END STOP DETECTION DEVICE

(75) Inventors: Christian Borchgrevink, Langhus (NO); Jon Flidh, Mjondalen (NO); Paula Guimaraes, legal representative, Porto (PT); Christopher Flidh, legal representative, Porto (PT)

(73) Assignee: Vetco Gray Scandinavia AS, Sandvika (NO)

( * ) Notice: Subject to any disclaimer, the term of this patent is extended or adjusted under 35 U.S.C. 154(b) by 635 days.

(21) Appl. No.: 13/391,138

(22) PCT Filed: Aug. 18, 2010

(86) PCT No.: PCT/IB2010/002041

§ 371 (c)(1), (2), (4) Date: Sep. 21, 2012

(87) PCT Pub. No.: WO2011/021093

PCT Pub. Date: Feb. 24, 2011

(65) Prior Publication Data

US 2013/0056658 A1 Mar. 7, 2013

(30) Foreign Application Priority Data

Aug. 20, 2009 (NO) .................................... 20092873

(51) Int. Cl.
*F16K 31/04* (2006.01)
*F16K 31/06* (2006.01)

(52) U.S. Cl.
CPC ............. *F16K 31/04* (2013.01); *F16K 31/045* (2013.01); *F16K 31/048* (2013.01); *F16K 31/0689* (2013.01); *F16K 31/0696* (2013.01)

(58) Field of Classification Search
CPC ............... F16K 31/04; F16K 31/0689; F16K 31/0696; F16K 31/045; F16K 31/048; F16K 37/0041; H01H 35/006
USPC ........... 251/129.04, 129.11, 129.13, 326, 64, 251/83, 109, 176, 321, 322, 323, 337; 137/554, 315.29, 315.31
See application file for complete search history.

(56) References Cited

U.S. PATENT DOCUMENTS 2,626,775 A * 1/1953 Lange .................. F16K 27/047 137/315.31
3,051,434 A * 8/1962 Gulick ................... F16K 3/186 251/167

(Continued)

FOREIGN PATENT DOCUMENTS

CN 86100605A A 7/1986
CN 1219225 A 6/1999

(Continued)

OTHER PUBLICATIONS

Machine Translation for EP 0074088 A2.*

(Continued)

*Primary Examiner* — Mary McManmon
*Assistant Examiner* — Ian Paquette
(74) *Attorney, Agent, or Firm* — GE Global Patent Operation

(57) ABSTRACT

An electrically operated valve actuator effective for shifting a valve (10) between open and closed positions is disclosed, the valve actuator comprising a movable member in the form of a valve stem (21) connected to a valve body (14), the movable member being driven by an electric motor (22) in linear motion between valve closing and valve opening positions, wherein electrical power to the motor is supplied via a current (25) control including a supplied current detection device. The movable member is designed for an idling length of travel (L) in the opening and closing directions during which the valve (10) is either fully open or fully closed, and the movable member is associated with buffer means (30) that during the idling length of travel gradually increases the torque and power required to move the movable member further in the open and closed positions of the valve (10), respectively.

20 Claims, 1 Drawing Sheet

(56) References Cited

U.S. PATENT DOCUMENTS

| | | | | |
|---|---|---|---|---|
| 3,788,600 | A * | 1/1974 | Allen | 251/214 |
| 4,213,480 | A | 7/1980 | Orum | |
| 4,770,390 | A | 9/1988 | Tratz et al. | |
| 4,844,110 | A * | 7/1989 | Paley | 137/1 |
| 4,888,996 | A * | 12/1989 | Rak et al. | 73/862.193 |
| 5,029,597 | A * | 7/1991 | Leon | 137/1 |
| 5,345,835 | A | 9/1994 | Schabert et al. | |
| 5,761,963 | A * | 6/1998 | Hartwig | 74/89.37 |
| 6,029,691 | A | 2/2000 | Tavor | |
| 6,352,239 | B1 * | 3/2002 | McIntosh et al. | 251/100 |
| 6,367,769 | B1 * | 4/2002 | Reiter | 251/129.19 |

FOREIGN PATENT DOCUMENTS

| | | | | |
|---|---|---|---|---|
| CN | 2756846 | | 2/2006 | |
| CN | 101063892 | B | 7/2011 | |
| EP | 0074088 | A2 * | 3/1983 | F16K 31/048 |
| EP | 0 287 299 | A2 | 10/1988 | |
| GB | 2 134 221 | A | 8/1984 | |

OTHER PUBLICATIONS

International Preliminary Report on Patentability, PCT Application No. PCT/IB2010/002041, dated Mar. 1, 2012.

Office Action and Search Report dated Apr. 15, 2014, for related Chinese Application 201080048167.5.

PCT International Search Report from International Application No. PCT/IB2010/002041 dated Nov. 22, 2010.

Norwegian Search Report from Norwegian Application No. 20092873 dated Mar. 18, 2010.

Office Action issued in connection with corresponding CN Application No. 201080036946.3 on Apr. 15, 2013.

* cited by examiner

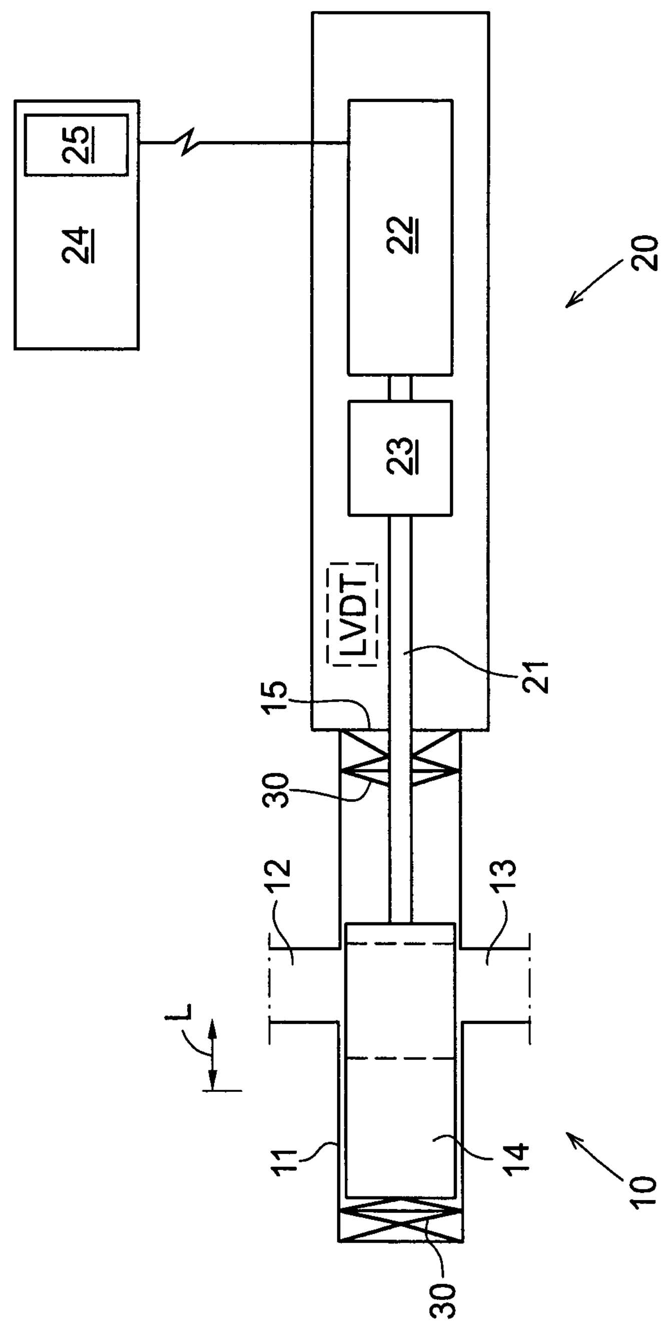
25
24
22
20
23
LVDT
21
15
30
12
13
L
11
14
10
30

ELECTRICALLY OPERATED VALVE ACTUATOR WITH ELECTRO-MECHANICAL END STOP DETECTION DEVICE

RELATED APPLICATION

This application claims priority to PCT application PCT/IB2010/002041 filed Aug. 18, 2010, which claims priority to Norwegian patent application NO 20092873 filed Aug. 20, 2009.

BACKGROUND OF THE INVENTION

1. Field of the Invention

The present invention relates to an electrically operated effective for shifting a valve between open and closed positions, valve actuator comprising a movable member in the form of a valve stem connected to a valve body, the movable member being driven by an electric motor in linear motion between valve closing and valve opening positions, wherein electric power to the motor is supplied via a current control including a supplied current detection device.

2. Description of the Related Art

In the subsea industry, valves are traditionally activated by hydraulic devices. In a hydraulic actuator, end stop detection and control meet no problem as it is the nature of a hydraulic system. When the end of travel is reached, the valve stem stops and the hydraulic pressure is returned to normal working pressure.

In electrically operated valve actuators this is quite different. The torque of the motor is proportional to the current supplied. If the rotor of a motor is stopped or impeded, such as by the valve stem reaching a sudden stop at the end of travel, the current in the stator windings will increase to overcome the additional torque required to move the rotor. If the current supply to the stator is not controlled, the stator windings will burn and the motor is destroyed. A current limiter, which is typically electronically controlled, is required to avoid burning of the motor windings. The primary control may be achieved by a position sensor included in the control circuit, and which is effective for detecting the position of the valve stem. This approach is demonstrated in EP 0 287 299, e.g., wherein a microprocessor periodically tests the status of the valve stem of a motor operated valve, and turns off the valve's motor if certain predefined criteria for the valve stem position and the valve stem load are satisfied. However, if the position sensor is offset or otherwise fails, the current control is set aside and the motor looses protection from overheating.

SUMMARY OF THE INVENTION

The present invention aims to eliminate the above-mentioned problem, and to provide a fail-safe end stop detection and over-heating protection for the motor of an electrically operated valve actuator.

The object is met in an electrically operated valve actuator comprising the features stated in claim 1.

The present invention thus briefly provides an electrically operated valve actuator as introduced above, further characterized in that the movable member, at each end of travel, is designed for an idling length of travel in the opening and closing directions during which the valve is either fully open or fully closed, and in that the movable member is associated with buffer means that during the idling length of travel gradually increases the torque and power required to move the movable member further in the open and closed positions of the valve, respectively.

Through these measures, an electro-mechanical end stop detection device is provided by which an early detection of the end position is accomplished. The mechanical part of the solution will give an absolute indication of the position of the movable member, and provides a physical space as well as a time window during which the increase in supplied current can be monitored and the motor be stopped, in a controlled manner. The present invention this way avoids requirement for the instantaneous reaction of the control circuit which is otherwise required in electrically operated valve actuators, such as in case of failure of the position sensor.

Although originating from the subsea industry, it will be understood that the present invention is not limited to subsea use but is rather applicable to any kind of electrically operated valve actuator of this type. In some applications the end stop device of the invention may be used as a primary control means, such as in a slab gate actuator, e.g. In other applications the end stop device may be used as a secondary and redundant control means, such as in a choke actuator, e.g. In the latter case, the end stop device not only protects the motor from overheating but may also provide a means for calibration of e.g. a primary position sensor in the valve actuator.

In one preferred embodiment, the movable member is contained between opposing walls comprised in a valve housing or in an actuator housing, and a buffer means is supported on each of said opposite walls. Alternatively, in a second preferred embodiment the movable member is contained between opposing walls comprised in a valve housing or an actuator housing, and a buffer means is supported in each end of the movable member. In each embodiment, the housing may be part of the actuator, or a valve housing connecting to the actuator.

The buffer means is a resilient element that is compressible under load from the movable member, and which preferably has elasticity to return to original shape when no longer under load. Alternatives include mechanical springs, elastic homogenous bodies and compressible gas volumes.

In a preferred embodiment the buffer means is a disc spring. Even more preferred, the buffer means comprises a set of disc springs that are chosen to provide a controlled flexibility within the idling length of travel of the movable member, this way also providing a corresponding typical increase in current required by the motor during the idling travel length. In this embodiment, at least one disc spring in the set of disc springs may have a flexibility that is different from the flexibility of at least one additional disc spring included in the set.

Further features and advantages provided by the present invention will be appreciated from the following detailed description of preferred embodiments.

BRIEF DESCRIPTION OF THE DRAWINGS

FIG. 1 is a schematic diagram of an electrically operated valve actuator according to an embodiment of the present invention.

DETAILED DESCRIPTION

The invention is illustrated schematically in the drawing (FIG. 1). With reference to the drawing, a valve generally indicated by reference sign 10 is shiftable between open and closed positions by means of a valve actuator generally indicated by reference sign 20. The valve 10 comprises a valve housing 11 having inlet port 12 and outlet port 13 for fluid flow in the open position of the valve (illustrated position). The fluid flow through the valve 10 is controlled by a valve body 14 which is linearly movable in the housing between open and closed positions. The shifting and positioning of the valve body 14 is accomplished by a movable stem 21, which enters through a wall 15 of the valve/actuator housing and connects to the valve body. The stem 21 is driven in reciprocating motion by an electrical motor 22, via an Rotary-To-Linear-converter 23 that converts the rotary motion of the motor to a linear motion of the stem. The motor 22 is supplied electrical power from a power source 24 via a current control 25. The current control 25 comprises a supplied current detection device and may also comprise a current limiter, as conventional.

The general set up heretofore described applies to many implementations of electrically operated valve actuators. In subsea practise, the valve stem 21, the motor 22, the Rotary-To-Linear-converter 23 as well as other components required for a fail-safe operation of the valve actuator will typically be housed in a pressure compensated housing connectable to the valve. A position sensor, such as an electrical transformer used for measuring linear displacement (Linear Variable Differential Transformer—LVDT) may be arranged in the actuator housing for detection of the valve and valve stem position. The present invention, as further described below, operates equally well as a singular end position detecting means or as a secondary redundant end position detecting means in addition to an LVDT-sensor, if appropriate. It will be realized that, when used in combination, the end stop detection device of the present invention may serve also for calibration of the position sensor, such as the LVDT-sensor.

With further reference to the drawing, the end stop detection device of the present invention comprises a buffer means 30 providing a mechanical and absolute indication of the end position of the valve body 14, and of the valve stem 21 connected thereto. Buffer means 30 may thus be arranged as illustrated on mutually opposite walls of the valve housing for abutting contact with the corresponding ends of the valve body, in each end position of the valve body. It will be realized that buffer means 30 may alternatively be arranged in each end of the valve body for abutting contact with the corresponding valve housing wall. It will also be realized, though not illustrated in the drawing, that buffer means 30 may alternatively be arranged in the actuator housing for interaction with the valve stem 21.

The buffer means 30 is arranged to act as a resilient damper means at the end of travel, providing a gradually increased resistance to further movement of the valve body/valve stem in direction of the fully open or fully closed positions, respectively. To this purpose the buffer means 30 is preferably realized as an element having elastic properties, such as a mechanical spring, a body of elastic material or a compressible gas volume. One advantageous realization of the invention foresees a buffer means including a set of disc springs which are chosen to provide in combination a significant and characteristic retardation of the valve body/valve stem, corresponding to a readily detectable rise in current supplied to the motor. In such package of disc springs all discs may be identical, or the set of discs may be formed by discs of different elasticity and combined to provide a desired non-linear rise in power demand, if appropriate.

In all cases, the buffer means 30 is operative in a physical space or time window provided in result of the movable member 14, 21 being designed for an idling length of travel L within which the valve, at each end of travel, is either fully open or fully closed. The idling length of travel may be realized in different ways according to the detailed structure of the valve or the valve actuator. For example, a valve body may be formed with a through hole for fluid, which through hole is extended to permit further displacement of the valve body in the fully open position of the valve. Likewise, the valve housing and valve body may be structured to permit the valve body to be further displaced in the closing direction when the valve is fully closed.

Essentially, the idling length of travel of the movable member and the buffer means at each end of travel provide in cooperation with the current control an electro-mechanical end stop detection device that protects the motor from overheating and provides smooth and reliable control of the motor in an electrically operated valve actuator.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. An electrically operated valve actuator effective for shifting a valve between open and closed positions, the valve actuator comprising:

a movable member comprising a valve stem connected to a valve body, a first end surface, a second end surface, and a side surface extending between the first end surface and the second end surface, the movable member being driven by an electric motor in a linear motion between valve closing and valve opening positions, wherein electrical power to the motor is supplied via a current control comprising a supplied current detection device;

the movable member, at each end of travel, is designed for an idling length of travel in the opening and closing directions during which the valve is either fully open or fully closed;

the movable member is associated with a buffer positioned so that, during the idling length of travel, the torque and current required to move the movable member further in the open and closed positions of the valve, respectively, gradually increases, wherein the movable member is contained between a first wall and an opposite second wall in a valve or actuator housing, and the buffer is supported in each end of the valve or actuator housing between the first and second end surfaces and first and second walls in the valve or actuator housing, respectively; and the current detection device monitors an increase in supplied current during the idling length and stops the motor within a time window of the idling length.

2. The actuator of claim 1, wherein the buffer comprises an elastic element.

3. The actuator of claim 2, wherein the buffer comprises at least one disc spring.

4. The actuator of claim 3, wherein the buffer comprises a set of disc springs, at least one of which has a flexibility which is different from the flexibility of at least one additional disc spring in the set of disc springs.

5. The actuator of claim 1, wherein the buffer comprises an elastic element.

6. The actuator of claim 5, wherein the buffer comprises at least one disc spring.

7. The actuator of claim 6, wherein the buffer comprises a set of disc springs, at least one of which has a flexibility which is different from the flexibility of at least one additional disc spring in the set of disc springs.

8. The actuator of claim 1, further comprising a position sensor.

9. The actuator of claim 8, wherein the position sensor is arranged in the actuator housing.

10. The actuator of claim 8, wherein the position sensor is an electrical transformer for measuring linear displacement.

11. The actuator of claim 8, wherein the position sensor is configured to detect the valve body and/or valve stem position.

12. An electrically operated valve actuator effective for shifting a valve between open and closed positions and having fail-safe electro-mechanical end stop detection, the valve actuator comprising:

a movable member comprising a valve stem connected to a valve body, the valve stem having a first end with a first end surface, and operably coupled to a valve body of a valve, a second end with a second end surface, and operably coupled to a rotary-to-linear converter operably coupled to an electric motor, and a side surface extending between the first end surface and the second end surface, the valve stem positioned to be driven by the electric motor in a linear motion to drive the valve body between valve closing and valve opening positions;

a current control comprising a supplied current detection device to supply electrical power to the motor;

a first end detection buffer device positioned to be engaged at a first end of travel of the valve body so that during the linear motion when the valve body approaches a valve opening position limit, torque and current required to move the valve body gradually increases; and a second end detection buffer device positioned to be engaged at a second end of travel of the valve body so that during the linear motion when the valve body approaches a valve closing position limit, the torque and the current required to move the valve body gradually increases;

wherein the valve body is contained between a first wall and a second wall in a valve or actuator housing, and wherein the first end detection buffer device is supported on a first end of the valve body between the first end surface of the valve body and the first wall of the valve or actuator housing, and the second buffer device is supported on a second end of the valve body between the second end surface of the valve body and the second wall of the valve or actuator housing; and wherein the current detection device monitors a increase in supplied current during the idling length and stops the motor within a time window of the idling length.

13. The actuator of claim 12, wherein the valve stem is contained between opposite walls in a valve or actuator housing, and wherein the first end detection buffer device is supported on a first of the opposite walls and the second and detection buffer device is supported on a second of the opposite walls.

14. The actuator of claim 12, wherein the first and second end detection buffer devices each comprise an elastic element connected to one or more of the following: an inner portion of the opposite walls of the housing, and one of the ends of the valve body.

15. The actuator of claim 14, wherein each elastic element comprises at least one disc spring.

16. The actuator of claim 14, wherein each elastic element comprises a set of disc springs, at least one of which has a flexibility which is different from the flexibility of at least one additional disc spring in the set of disc springs.

17. An electrically operated valve actuator effective for shifting a valve in a valve or actuator housing between open and closed positions and having fail-safe electro-mechanical end stop detection, the valve actuator comprising:

a movable member comprising a valve stem connected to a valve body, the valve stem having a first end with a first end surface, and operably coupled to a valve body of a valve, a second end with a second end surface, and operably coupled to a rotary-to-linear converter operably coupled to an electric motor, and a side surface extending between the first end surface and the second end surface, the valve stem positioned to be driven by the electric motor in a linear motion to drive the valve body between valve closing and valve opening positions;

a current control comprising a supplied current detection device to supply electrical power to the motor;

a first end detection buffer device positioned between the first end surface of the valve body and the valve or actuator housing to be engaged at a first end of travel of the valve body so that during the linear motion when the valve body approaches a valve opening position limit, torque and current required to move the valve body gradually increases, the first end detection buffer device comprising a set of disc springs, at least one of which has a flexibility which, is different from the flexibility of at least one additional disc spring in the set of disc springs; and a second end detection buffer device located at an opposite side of the valve body from the first end detection buffer device, and positioned between the second end surface of the valve body and the valve or actuator housing, to be engaged at a second end of travel of the valve body so that during the linear motion when the valve body approaches a valve closing position limit, the torque and the current required to move the valve body gradually increases, the second end detection buffer device comprising a set of disc springs, at least one of which has a flexibility which is different from the flexibility of at least one additional disc spring in the set of disc springs;

wherein the current detection device monitors an increase in supplied current during the idling length and stops the motor within a time window for the idling length.

18. The actuator of claim 17, wherein the buffer comprises an elastic element.

19. The actuator of claim 17, wherein the buffer comprises at least one disc spring.

20. The actuator of claim 17, wherein the buffer comprises a set of disc springs, at least one of which has a flexibility which is different from the flexibility of at least one additional disc spring in the set of disc springs.

* * * * *